No. 692,988. Patented Feb. 11, 1902.
A. S. DAVIS.
DRILL CHUCK.
(Application filed May 20, 1901.)
(No Model.)

Witnesses:
Henry L. Deck.
F. F. Schyinger

A. S. Davis Inventor.
By Wilhelm & Bonner
Attorneys.

THE NORRIS PETERS CO., PHOTO-LITHO., WASHINGTON, D. C.

UNITED STATES PATENT OFFICE.

ADELBERT S. DAVIS, OF SENECA FALLS, NEW YORK, ASSIGNOR TO THE SENECA FALLS MANUFACTURING COMPANY, OF SENECA FALLS, NEW YORK.

DRILL-CHUCK.

SPECIFICATION forming part of Letters Patent No. 692,988, dated February 11, 1902.

Application filed May 20, 1901. Serial No. 60,982. (No model.)

*To all whom it may concern:*

Be it known that I, ADELBERT S. DAVIS, a citizen of the United States, residing at Seneca Falls, in the county of Seneca, in the State of New York, have invented new and useful Improvements in Drill-Chucks, of which the following is a specification.

This invention relates to that class of chucks or tool-holders which are used in drilling and other machines for receiving the shank or tang of the drill or other tool and which are provided with devices which permit the shank to be readily inserted and locked in the chuck and to be readily released and withdrawn when the tool is to be changed while the machine is in motion.

The object of my invention is to produce a chuck of this kind which is very simple and inexpensive and at the same time efficient and convenient for use.

Figure 1:
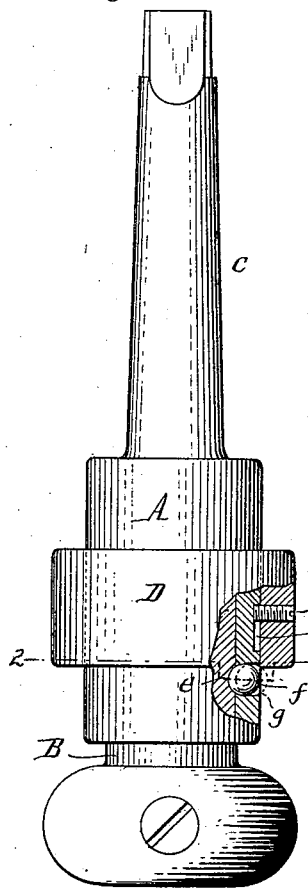
Figure 4:
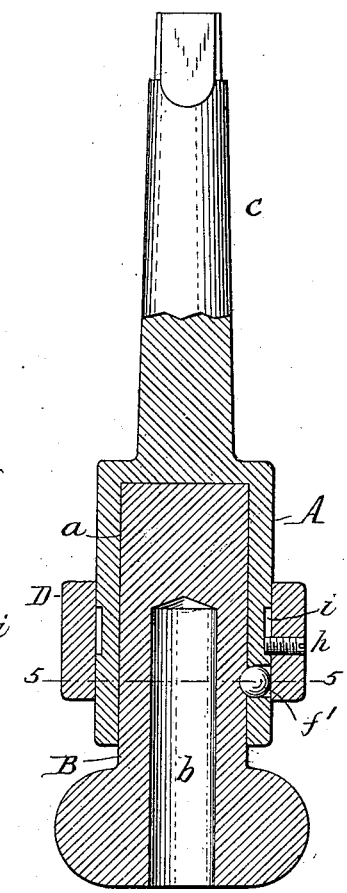
Figure 7:
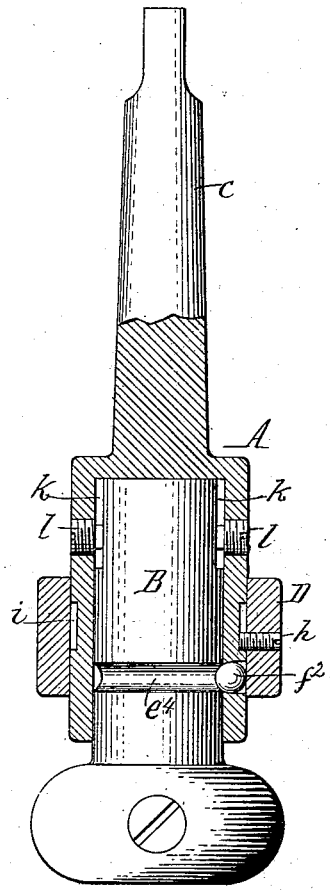
Figure 2:
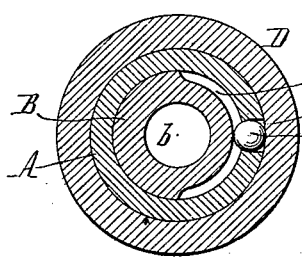
Figure 5:
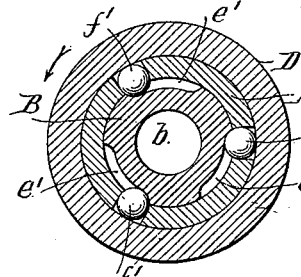
Figure 6:
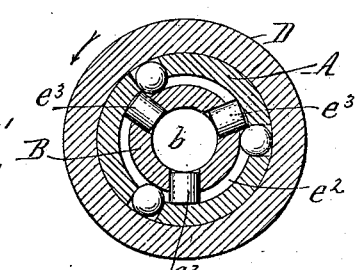
Figure 3:
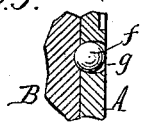

In the accompanying drawings, Figure 1 is an elevation, partly in section, of a chuck provided with my improvements, showing the collet or filling-piece ready to be released. Fig. 2 is a horizontal section in line 2 2, Fig. 1. Fig. 3 is a fragmentary vertical section showing the opening in which the locking-ball is arranged contracted at both ends. Fig. 4 is a vertical section of a chuck embodying a plurality of locking devices and showing the collet locked in place. Fig. 5 is a horizontal section in line 5 5, Fig. 4. Fig. 6 is a horizontal section similar to Fig. 5, but showing a modified construction of the grooves in the collet. Fig. 7 is a sectional elevation showing another embodiment of my invention.

Like letters of reference refer to like parts in the several figures.

A represents the socket-piece of the chuck, having a cylindrical socket *a* for the reception of the collet, sleeve, or filling-piece B, which is provided with the usual bore *b* for the reception of the bit or other tool. The socket-piece A is provided with a shank *c*, by which it is attached to the rotary spindle of the drilling or other machine.

D represents a movable ring or collar which surrounds the cylindrical socket *a* of the chuck and which is capable of movement on the same in the longitudinal or axial direction thereof. This ring is constructed with a plain cylindrical inner face, which fits around the outer cylindrical face of the socket *a*.

In the construction of the device represented in Figs. 1 and 2 the collet or filling B is provided in its outer cylindrical surface with a horizontal groove *e*, which extends partly around the collet and in which engages a locking-ball *f*, arranged in a radial opening *g*, formed in the wall of the socket *a* in such a way that this ball can move into the groove *e* for locking the collet in the socket or out of the groove for releasing the collet. The vertical cross-section of the groove corresponds with the curvature of the inwardly-projecting part of the ball. The opening *g* is shorter than the diameter of the ball, so that when the latter is pressed inwardly, so as to be flush with the outer surface of the filling-piece, by pushing the ring down over the ball, as shown in Fig. 2, the ball projects on the inner side of the socket. The ball is prevented from escaping from the inner end of the opening by contracting the opening slightly at the inner end.

The ring D is held on the socket by a device of any suitable construction which prevents the ring from dropping from the socket and which allows the necessary vertical movement of the ring. A suitable device for this purpose consists of a headless screw *h*, which projects from the ring into an annular groove *i* in the outer surface of the socket. This groove can be made of such height that when the ring is pushed up to its highest position, as shown in Fig. 1, the ring does not entirely clear the opening in which the ball is arranged and prevents the ball from escaping from the outer end of the opening, but allows the ball to move outwardly far enough to withdraw entirely from the groove *e* in the filling-piece, as shown by dotted lines in Fig. 1.

When the filling-piece is to be inserted into the socket, the ring is raised so high as to release the ball. The upward pressure on the filling-piece pushes the ball outwardly out of the way. The ring is then lowered to its locking position and forces the ball inward, when the groove of the filling-piece coincides with the ball. The ring now holds the ball in its locking position, in which the ball locks the filling-piece in the socket and prevents the latter from being withdrawn. Upon raising the ring, so as to release the ball, the filling-piece can be readily withdrawn from the socket.

In the construction represented in Figs. 1 to 6 the groove $e$ in the filling-piece does not extend entirely around the filling-piece, but is segmental. The ball upon reaching the end of the groove in rotating with the socket in the direction of the arrow, Figs. 5 and 6, compels the filling-piece and the tool secured therein to rotate with the socket, and so serves not only for locking the filling-piece in the socket, but also for driving the tool.

The ball can be prevented from escaping from the outer end of the opening $g$ by contracting the latter at its outer end also, as shown in Fig. 3.

In the construction shown in Figs. 4 and 5 the filling-piece is provided with three segmental grooves $e'$ and the socket with three locking-balls $f'$, instead of the single segmental groove and ball shown in Figs. 1 and 2.

In the construction shown in Figs. 6 these segmental grooves are formed in the filling-piece by providing the latter with an annular groove $e^2$ and breaking the continuity of the groove by pins or plugs $e^3$, secured in the filling-piece and projecting with their outer portions into this groove.

In the construction represented in Fig. 7 the filling-piece is provided with an annular groove $e^4$ and the socket with a single locking-ball $f^2$. In this construction the ball serves only to lock the filling-piece in the socket and not to drive the filling-piece. A separate driving device must therefore be provided for the filling-piece, and this construction is in that respect less desirable than those represented in Figs. 1, 2, 4, and 6. For that purpose the filling-piece is provided at its upper end with the usual flattened sides $k$ and the socket with driving projections $l$, preferably formed by screws.

I claim as my invention—

1. In a chuck, the combination with a socket having an opening which extends through its wall, a filling-piece provided with an external groove in alinement with said opening, a locking-ball arranged in said opening and capable of moving inward and outward therein, said ball being adapted to project into the groove in the filling-piece when in locking position, and a ring surrounding the socket and capable of movement in the axial direction of the same, said ring having a plain inner face coacting with the ball to force the latter inward to its locking position, substantially as described.

2. In a chuck, the combination with a socket member having an opening which extends through its wall, a filling-piece provided with an external groove in alinement with said opening, and a locking-ball arranged in said opening and capable of moving inward and outward therein, said ball projecting into the groove in the filling-piece when in locking position, of a locking-ring snugly fitting throughout its width the periphery of the socket member and capable of movement in the axial direction of the same, said ring having a plain inner face by which the ball is forced inward to its locking position, substantially as described.

3. In a chuck, the combination with a socket member having an opening which extends through its wall, a filling-piece provided with an external groove, and a locking device arranged in said opening and capable of moving inward and outward therein, the portion of said device projecting beyond the wall of the socket member having a curved uninterrupted periphery, of a locking-ring snugly surrounding said socket member and capable of movement in the axial direction of the same, said ring having a plain inner face coacting with the portion of the locking device, extending through the wall of the socket member, for forcing the device inward into locking position, and a stop device consisting of an annular groove in the outer side of said socket and a projection on the inner side of said ring entering said groove, substantially as described.

Witness my hand this 14th day of May, 1901.

ADELBERT S. DAVIS.

Witnesses:
CHARLES F. HAMMOND,
PAUL B. KENDEY.